(12) United States Patent
Hasegawa et al.

(10) Patent No.: US 11,256,024 B2
(45) Date of Patent: Feb. 22, 2022

(54) ELECTRONIC EQUIPMENT

(71) Applicant: Japan Display Inc., Tokyo (JP)

(72) Inventors: Makoto Hasegawa, Tokyo (JP);
Nobuyuki Suzuki, Tokyo (JP);
Michihide Shibata, Tokyo (JP)

(73) Assignee: JAPAN DISPLAY INC., Tokyo (JP)

( * ) Notice: Subject to any disclaimer, the term of this patent is extended or adjusted under 35 U.S.C. 154(b) by 0 days.

(21) Appl. No.: 17/219,881

(22) Filed: Apr. 1, 2021

(65) Prior Publication Data

US 2021/0311245 A1     Oct. 7, 2021

(30) Foreign Application Priority Data

Apr. 3, 2020  (JP) .............................. JP2020-067613

(51) Int. Cl.
*F21V 8/00* (2006.01)
*G02F 1/1335* (2006.01)

(52) U.S. Cl.
CPC ......... *G02B 6/0075* (2013.01); *G02B 6/0055* (2013.01); *G02B 6/0068* (2013.01); *G02B 6/0083* (2013.01); *G02B 6/0085* (2013.01); *G02F 1/133614* (2021.01)

(58) Field of Classification Search
CPC . G02F 1/133602–133613; G02B 6/0075–008; G02B 6/0068
See application file for complete search history.

(56) References Cited

U.S. PATENT DOCUMENTS

2017/0053592 A1     2/2017  Shin et al.

FOREIGN PATENT DOCUMENTS

| CN | 108897171 A | * | 11/2018 | ........... G02B 6/0021 |
| JP | 2017-40908 A | | 2/2017 | |
| KR | 20100088961 A | * | 8/2010 | |
| WO | WO-2017061312 A1 | * | 4/2017 | ....... G02F 1/133603 |

* cited by examiner

*Primary Examiner* — Mariceli Santiago
(74) *Attorney, Agent, or Firm* — Xsensus LLP

(57) ABSTRACT

According to one embodiment, an electronic equipment includes a liquid crystal panel, an illumination device, and a light receiving element. The illumination device includes a first light guide which includes a first opening, a first light source, a second light guide including a first area, a second area, a first main surface, a second main surface, a first side surface, a second side surface, and a continuous surface, a second light source opposed to each of the continuous surface and the second side surface, and a light reflective layer covering each of the continuous surface and the first side surface.

15 Claims, 13 Drawing Sheets

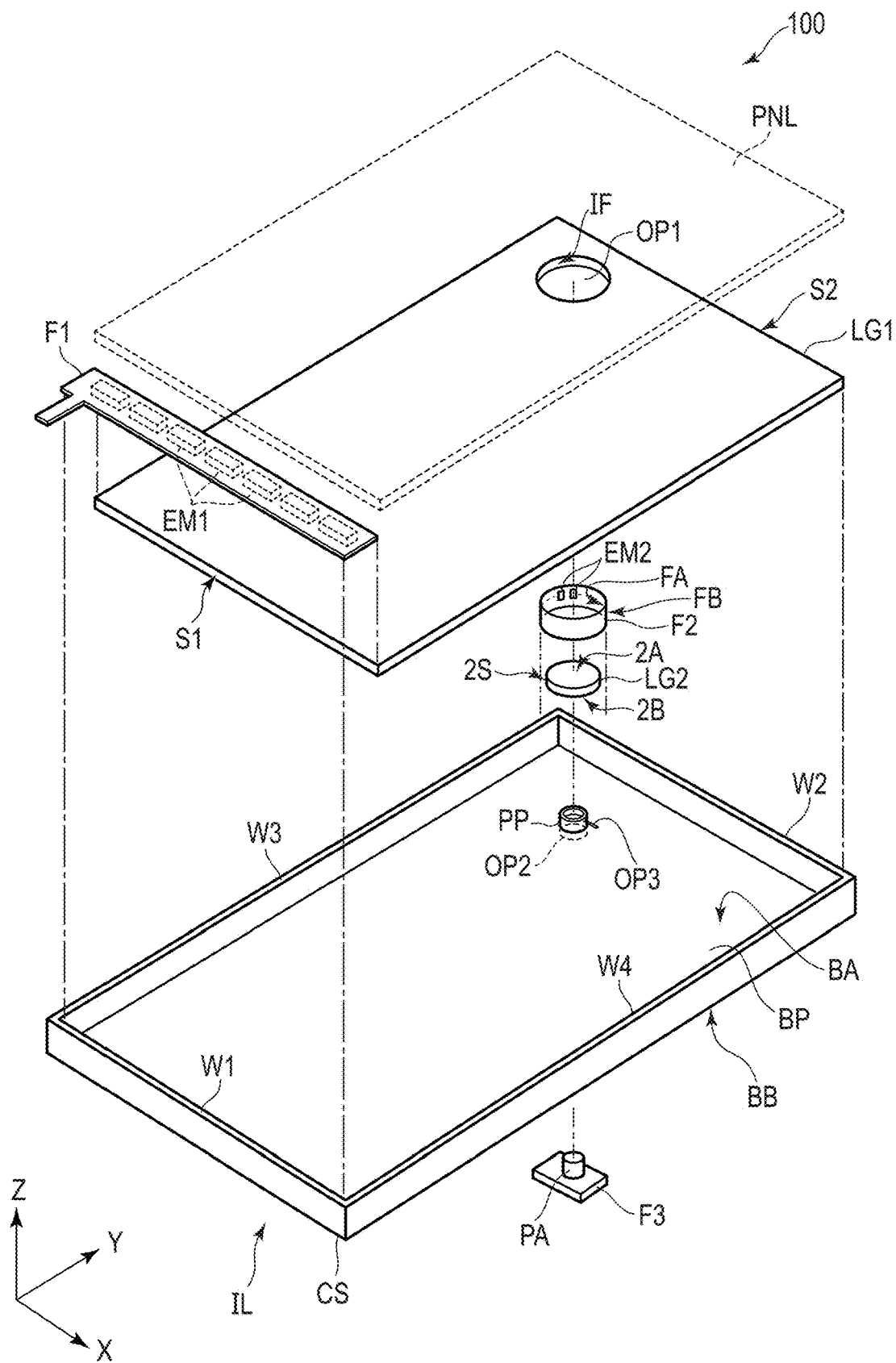
F I G. 1

ELECTRONIC EQUIPMENT

CROSS-REFERENCE TO RELATED APPLICATIONS

This application is based upon and claims the benefit of priority from Japanese Patent Application No. 2020-067613, filed Apr. 3, 2020, the entire contents of which are incorporated herein by reference.

FIELD

Embodiments described herein relate generally to electronic equipment.

BACKGROUND

In recent years, electronic equipments including a display part and a light receiving element on the same surface side, such as smartphones are commercially used. In such an electronic equipment, it is highly desired that the light receiving element is disposed outside the display part to secure a space where the light receiving element is disposed while the bezel width outside the display part is reduced.

BRIEF DESCRIPTION OF THE DRAWINGS

FIG. 1 is an exploded perspective of an electronic equipment of a first embodiment.

DETAILED DESCRIPTION

Figure 2:
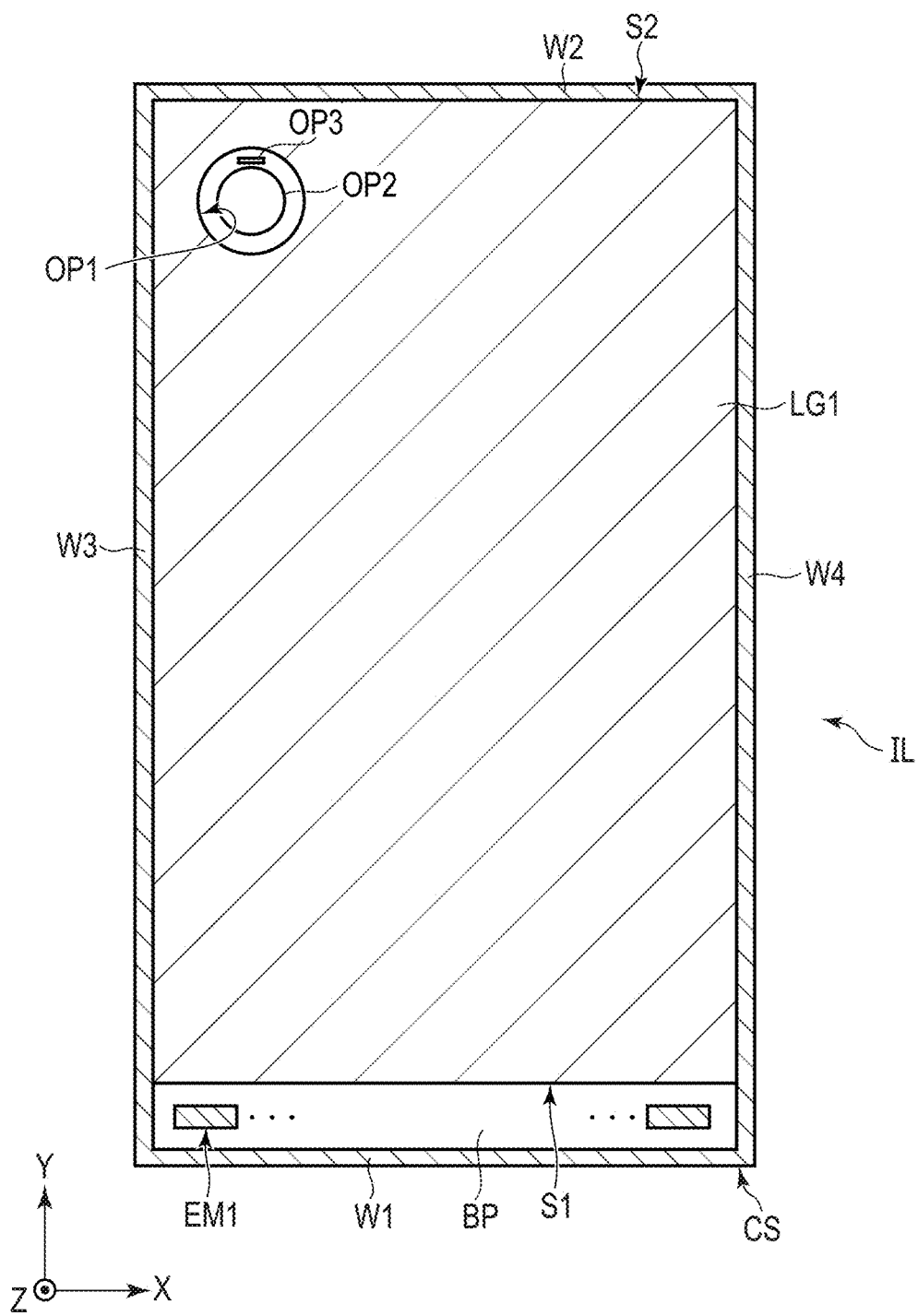
FIG. 2 is a plan view of an illumination device of the first embodiment of FIG. 1.

In general, according to one embodiment, there is provided an electronic equipment comprising a liquid crystal panel, an illumination device configured to illuminate the liquid crystal panel, and a light receiving element. The illumination device including a first light guide which includes a first opening and is opposed to the liquid crystal panel, a first light source configured to irradiate light to the first light guide, a second light guide including a first area, a second area surrounding the first area, a first main surface extending over the entirety of the first area and the entirety of the second area, a second main surface extending the first area alone and positioned in the opposite side of the first surface, a first side surface continuous from the first main surface, a second side surface positioned inside the first side surface in a plan view and continuous from the second main surface, and a continuous surface continuous from each of the first side surface and the second side surface, the second light guide positioned in the first opening between the liquid crystal panel and the light receiving element, a second light source opposed to each of the continuous surface and the second side surface between the first main surface and the second main surface to irradiate light onto the second side surface, and a light reflective layer covering each of the continuous surface and the first side surface.

Hereinafter, embodiments will be described with reference to the drawings. It should be noted that the disclosure is merely an example, and those which can easily be conceived by a person skilled in the art as to appropriate changes while maintaining the gist of the invention are naturally included in the scope of the invention. Further, in order to clarify the description, the drawings may be schematically represented in terms of the width, thickness, shape, and the like of each portion as compared with the actual embodiment, but they are merely examples and are not intended to limit the interpretation of the present invention. Further, in the present specification and each of the figures, the same reference numerals are used to denote components that perform the same or similar functions as those described above with respect to the figures described above, and redundant detailed descriptions may be omitted as appropriate.

FIG. 1 is an exploded perspective of an electronic device 100 of a first embodiment.

As in FIG. 1, a first direction X, a second direction Y, and a third direction Z are orthogonal to each other; however, they may cross each other at an angle other than 90 degrees. The electronic equipment 100 includes a liquid crystal panel PNL, illumination device IL, and light receiving element PA. In this example, the illumination device IL is the illumination device IL of the first embodiment.

The illumination device IL includes a first light guide LG1, second light guide LG2, a plurality of first light sources EM1, a plurality of second light sources EM2, a wiring substrate F1, a wiring substrate F2, and case CS. The illumination device IL structured as above illuminates a liquid crystal panel PNL shown in FIG. 1 in a simplified manner with a dashed line, for example.

The first light guide LG1 is formed in a flat panel which is parallel to an X-Y plan defined by the first direction X and the second direction Y. The first light guide LG1 is opposed to the liquid crystal panel PNL in the third direction Z. The first light guide LG1 includes a side surface S1, a side surface S2 which is opposite to the side surface S1, a first opening OP1, and a side surface IF. The side surfaces S1 and S2 extend in the first direction X. For example, the side surfaces S1 and S2 are plans parallel to an X-Z plan defined by the first direction X and the third direction Z. The first opening OP1 is a through hole passing through the first light guide LG1 in the third direction Z. The first opening OP1 is positioned between the side surfaces S1 and S2 in the second direction Y to be closer to the side surface S2 than is the side surface S1. Note that the first opening OP1 may be a notch which is in the side surface S2 to be recessed toward the side surface S1 from the side surface S2. The side surface IF is a surface exposed from the first opening OP1.

The first light sources EM1 are arranged in the first direction X at intervals. Each of the first light sources EM1 is mounted on a wiring substrate F1 to be electrically connected thereto.

The second light guide LG2 overlaps the first opening OP1 in the third direction Z. The second light guide LG2 includes a first main surface 2A, a second main surface 2B which is opposite to the first main surface 2A, and a side surface 2S positioned between the first main surface 2A and the second main surface 2B. The first main surface 2A and the second main surface 2B are plans parallel to the X-Y plan. The first main surface 2A is opposed to the liquid crystal panel PNL, and the second main surface 2B is opposed to the light receiving element PA.

The wiring substrate F2 is formed in a ring shape surrounding the side surface 2S of the second light guide LG2. The wiring substrate F2 includes a mount surface FA and an adhesion surface FB which is opposite to the mount surface FA. The second light sources EM2 are mounted on the mount surface FA at intervals to be electrically connected to the wiring substrate F2. The second light source EM2 is smaller than the first light source EM1. The first light source EM1 and the second light source EM2 are, for example, a light emitting diode (LED).

The case CS accommodates the first light guide LG1, the second light guide LG2, the first light source EM1, the second light source EM2, the wiring substrate F1, and the wiring substrate F2.

The case CS includes side walls W1 to W4, an bottom plate BP, and a projection PP. The side walls W1 and W2 extend in the first direction X and are opposed to each other. The side walls W3 and W4 extend in the second direction Y and are opposed to each other. The bottom plate BP includes a first surface BA opposed to the first light guide LG1, a second surface BB opposite to the first surface BA, an opening OP2, and an opening OP3. Each of the openings OP2 and OP3 is a through hole passing through the bottom plate BP in the third direction Z. The openings OP2 and OP3 overlap the first opening OP1 in the third direction Z. The opening OP3 is a through hole to pass the wiring substrate F2, for example. The projection PP projects from the first surface BA of the bottom plate BP toward the liquid crystal panel PNL in the third direction Z, and is disposed to surround the opening OP2.

The light receiving element PA is disposed in the third direction Z to overlap the opening OP2. The light receiving element PA is mounted on the wiring substrate F3 to be electrically connected thereto. Note that the light receiving element PA may be electrically connected to the wiring substrate F2 which is shared with the second light source EM2.

The liquid crystal panel PNL overlaps the first light guide LG1, and overlaps the second light guide LG2, second light source EM2, wiring substrate F2, and light receiving element PA through the first opening OP1.

FIG. 2 is a plan view of the illumination device IL of the first embodiment shown in FIG. 1. Note that the wiring substrate F1, second light source EM2, wiring substrate F2, and second light guide LG2 of FIG. 1 are omitted from the depiction of FIG. 2.

As in FIG. 2, the first light source EM1 is positioned between the side surface S1 of the first light guide LG1 and the side wall W1 of the case CS, and emits light to the side surface S1. The light emitted from the first light source EM1 enters the first light guide LG1 from the side surface S1 and proceeds in the first light guide LG1 from the side surface S1 to the side surface S2 in the second direction Y.

The openings OP2 and OP3 of the bottom plate BP are positioned inside the first opening OP1 of the first light guide LG1. In the example depicted, the first opening OP1 and the opening OP2 are a circular in a plan view; however, the shape may be an ovally rounded rectangle, or a polygonal, or the like. The first opening OP1 is disposed to be closer to the side wall W3 than is the side wall W4 in the first direction X; however, it may be disposed in the middle between the side wall W3 and the side wall W4, or may be disposed closer to the side wall W4.

Figure 3:
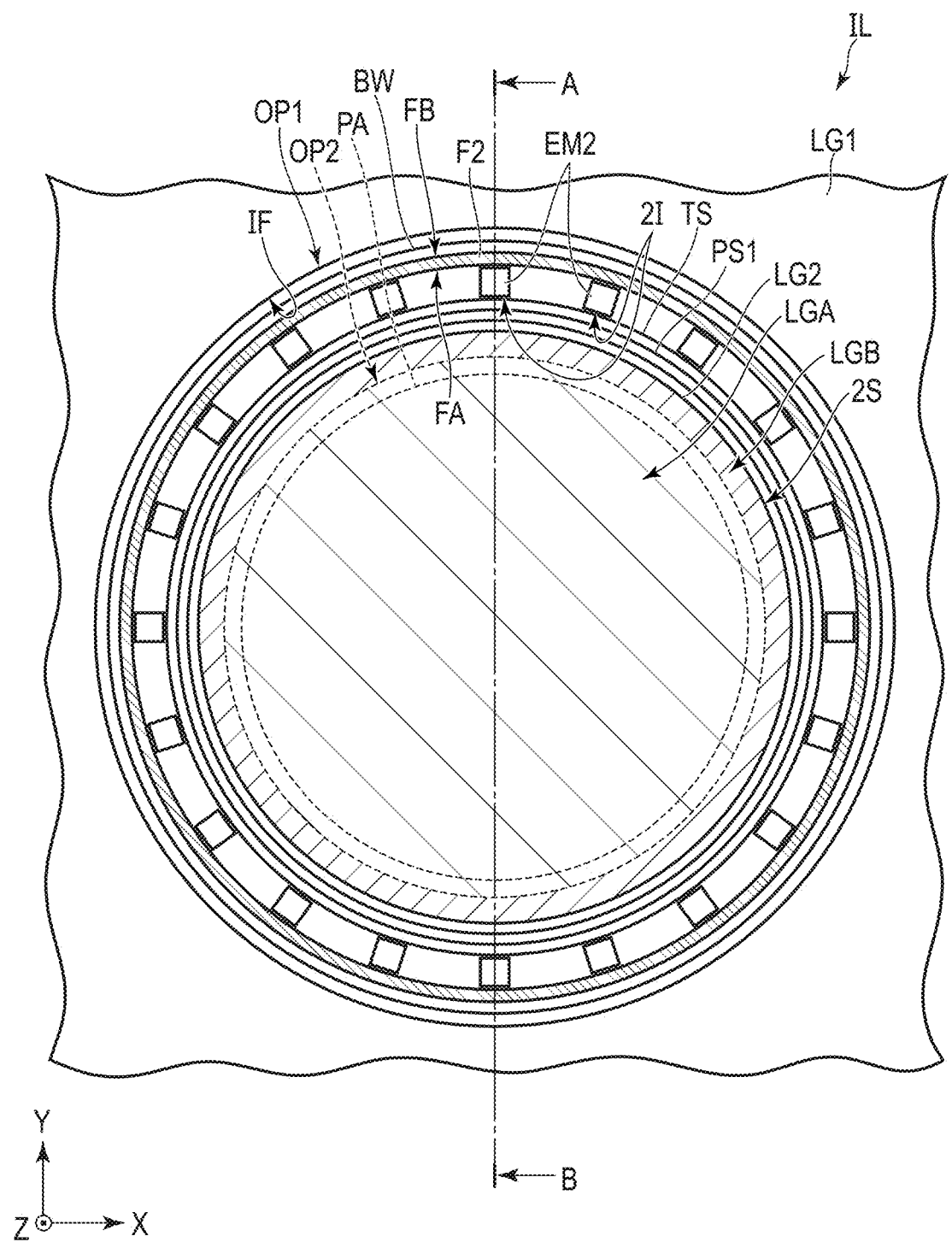
FIG. 3 is an enlarged plan view of the illumination device of the first embodiment.

FIG. 3 is an enlarged plan view of the illumination device IL of the first embodiment.

As in FIG. 3, the illumination device IL further includes a light shielding tape BW, a wavelength conversion element TS, and a prism sheet PS1.

The light shielding tape BW, wiring substrate F2, second light sources EM2, wavelength conversion element TS, prism sheet PS1, and second light guide LG2 are positioned inside the first opening OP1. The light receiving element PA is positioned inside the first opening OP1 and the opening OP2.

The light shielding tape BW is positioned between the side surface IF and the wiring substrate F2 and is shaped in a ring. The second light sources EM2 are positioned between the side surface 2S of the second light guide LG2 and the wiring substrate F2, and include a rectangular light emitting surface 21 opposed to the side surface 2S. Note that, the second light source EM2 is disposed such that the longitudinal direction of the light emitting surface 21 becomes parallel to the third direction Z. The wavelength conversion element TS and the prism sheet PS1 are each positioned between the side surface 2S and the light emitting surface 21 of the second light source EM2, and formed in a ring.

The second light guide LG2 includes an area LGA overlapping the light receiving element PA, and an area LGB surrounding the area LGA. In the example depicted, the area LGA is hatched in a left-side-up manner, and the area LGB is hatched in a right-side-up manner. The opening OP2 corresponds to a boundary between the area LGA and the area LGB.

Figure 4:
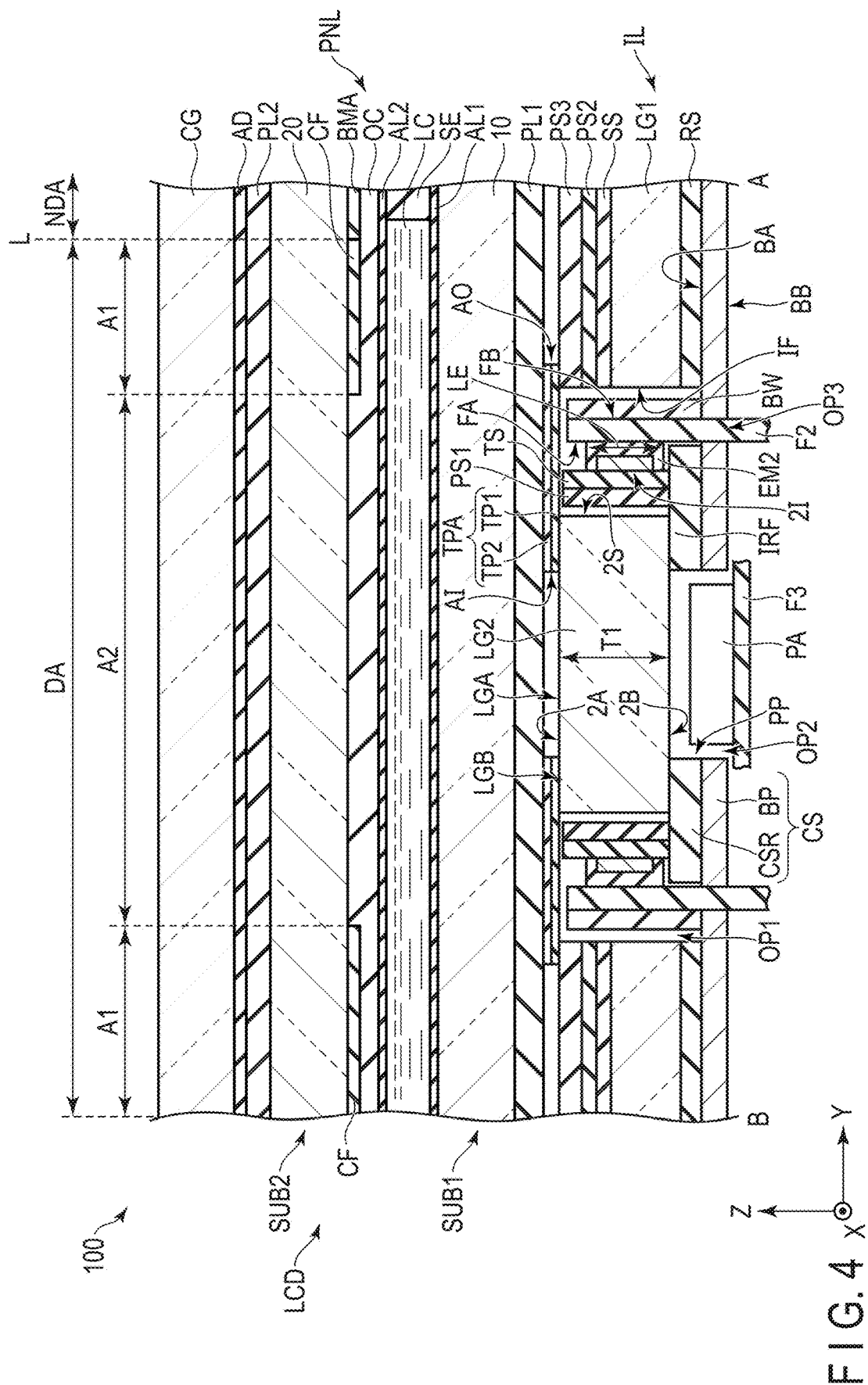
FIG. 4 is a cross-sectional view of the electronic equipment, taken along line A-B of FIG. 3.

FIG. 4 is a cross-sectional view of the electronic equipment 100 taken along line A-B of FIG. 3. In this example, the cross-sectional view of the electronic equipment 100 including the liquid crystal panel PNL, illumination device IL, and light receiving element PA in the second direction Y is shown.

As in FIG. 4, the illumination device IL further includes a reflection sheet RS, a scattering sheet SS, a prism sheet PS2, a prism sheet PS3, and an adhesion part TPA.

The reflection sheet RS, first light guide LG1, scattering sheet SS, prism sheet PS2, and prism sheet PS3 are arranged in the third direction Z in this order, and are accommodated in the case CS. The case CS includes a resin seat CSR. The seat CSR forms the projection PP with the bottom plate BP. The projection PP is positioned inside the first opening OP1. Each of the reflection sheet RS, scattering sheet SS, prism sheets PS2 and PS3 include an opening overlapping the first opening OP1.

The second light guide LG2 is formed of a transparent resin and includes a light scattering agent which scatters the light. For example, the second light guide LG2 is formed of acryl, or polystyrene, or the like. Furthermore, for example, the light scattering agent is microparticles of silica, titanium oxide, aluminum oxide, or the like. The shape of the light scattering agent may be a sphere, or ball, or scale, or amorphous shape, or the like, and no limitation is intended by these examples. Although it depends on the type of the light scattering agent, the light proceeding in the second light guide LG2 is scattered and transmitted. The second light guide LG2 is positioned between the liquid crystal panel PNL and the light receiving element PA. The first main surface 2A and the second main surface 2B are flat plans which are, preferably, parallel to each other. The second light guide LG2 has a thickness T1. The thickness T1 has a length from the second main surface 2B to the first main surface 2A in the third direction Z. The thickness T1 is approximately 0.6 mm.

The wavelength conversion element TS is positioned between the side surface 2S and the second light source EM2. The wavelength conversion element TS adheres to the light emitting surface 21 of the second light source EM2. The prism sheet PS1 is positioned between the side surface 2S and the wavelength conversion element TS, and adheres to the wavelength conversion element TS. In the example depicted, the prism sheet PS1 is apart from the side surface 2S.

The wavelength conversion element TS absorbs the light emitted from the second light source EM2 and emits the light wavelength of which is longer than that of the absorbed light. The prism sheet PS1 concentrates the light emitted from the wavelength conversion element TS into the second direction Y, for example. The wavelength conversion element TS contains, for example, quantum dots as a light emitting material, or, may contain a fluorescent material or a phosphorescent material instead.

For example, the second light source EM2 emits ultraviolet wavelength light (excitation light). The wavelength conversion element TS absorbs the excitation light, emits blue, green, or red to generate white illumination light.

In another example, the second light source EM2 emits blue wavelength light (excitation light). The wavelength conversion element TS absorbs the excitation light to emit yellow light. That is, the yellow light as the conversion light and blue light as the non-conversion light are mixed to generate the white illumination light. Note that, if the second light source EM2 emits the white light, the wavelength conversion element TS may be omitted.

The second light source EM2 is mounted on the wiring substrate F2 through a flip chip bonding method. For example, the second light source EM2 and the wiring substrate F2 are pressed to be closer to each other and heated while a conductive adhesive agent containing conductive particles is interposed between the bump of the second light source EM2 and the terminal of the wiring substrate F2 so that the bump of the second light source EM2 and the terminal of the wiring substrate F2 is electrically and physically connected. In the example depicted, the second light source EM2 has a length LE in the third direction Z (longitudinal direction of the light emitting surface 21). The length LE is approximately 0.4 mm.

The wiring substrate F2 is positioned between the second light source EM2 and the light shielding tape BW. The wiring substrate F2 passes through the opening OP3 toward the second surface BB side of the bottom plate BP. The light shielding tape BW is positioned between the wiring substrate F2 and the side surface IF of the first light guide LG1 to be adhered to the adhesion surface FB. Thus, the gap between the first light guide LG1 and the second light guide LG2 is light-shielded by the light shielding tape BW.

A polarizer PL1, the liquid crystal panel PNL, a polarizer PL2, and a cover glass CG are arranged in this order in the third direction Z, and form a liquid crystal element LCD with an optical switch function with respect to the light proceeding in the third direction Z.

The adhesion part TPA includes a first tape TP1 and a second tape TP2, is positioned between the liquid crystal panel PNL and the illumination device IL to adhere the illumination device IL and the liquid crystal panel PNL. The adhesion part TPA is formed in a ring shape and has an inner periphery AI and an outer periphery AO. The inner periphery AI overlaps the second light guide LG2 in the area LGB, and the outer periphery AO overlaps the first light guide LG1. In the example depicted, the adhesion part TPA overlaps each of the side surface IF, second light source EM2, and side surface 2S but does not overlap the light receiving element PA.

The first tape TP1 and the second tape TP2 are, for example, a ring-shaped double sided tape. The first tape TP1 is formed of a light reflective material which is, for example, white. The first tape TP1 is in contact with the first main surface 2A in the area LGB and is in contact with the prism sheet PS3. The second tape TP2 is formed of a light shielding material which is, for example, black. The second tape TP2 is positioned between the first tape TP1 and the liquid crystal panel PNL, and is layered on the first tape TP1. The second tape TP2 overlaps the entirety of the first tape TP1 in a plan view. The second tape TP2 adheres the first tape TP1 and the polarizer PL1. Since the prism sheet PS1, wavelength conversion element TS, and second light source EM2 are positioned immediately below the second tape TP2, a user of the electronic equipment 100 will not recognize them.

The liquid crystal panel PNL may include any structure corresponding to a display mode using horizontal field along the substrate main surface, display mode using a vertical field along the normal vector of the substrate main surface, display mode using an inclined field which is diagonally inclined with respect to the substrate main surface, and display mode using any optional combination of the aforementioned horizontal, vertical, and inclined fields. The substrate main surface is a surface parallel to the X-Y plan.

The liquid crystal panel PNL includes a display part DA to display an image and a non-display part NDA surrounding the display part DA. The liquid crystal panel PNL includes a first substrate SUB1, second substrate SUB2, liquid crystal layer LC, and sealant SE. The sealant SE is positioned in the non-display area NDA, and adheres the first substrate SUB1 and the second substrate SUB2 to seal the liquid crystal layer LC.

Now, the main parts of the first substrate SUB1 and the second substrate SUB2 will be explained. The first substrate SUB1 includes an insulating substrate 10 and an alignment film AL1. The second substrate SUB2 includes an insulating substrate 20, a color filter CF, a light shielding layer BMA, a transparent layer OC, and an alignment film AL2.

The insulating substrates 10 and 20 are a transparent substrate such as glass substrate or flexible resin substrate. The alignment films AL1 and AL2 are in contact with the liquid crystal layer LC. The color filter CF, light shielding layer BMA, and transparent layer OC are positioned between the insulating substrate 20 and the liquid crystal layer LC. Note that, in the example depicted, the color filter CF is provided with the second substrate SUB2; however, it may be provided with the first substrate SUB1.

The light shielding layer BMA is positioned in the non-display part NDA. The boundary L between the display part DA and the non-display part NDA is, for example, defined by an inner end of the light shielding layer BMA (end in the display part DA side). The sealant SE is provided with a position overlapping the light shielding layer BMA.

Although the details of the color filter CF are omitted here, note that, for example, there are a red colored layer disposed in a read pixel, green colored layer disposed in a green pixel, and blue colored layer disposed in a blue pixel. Furthermore, the color filter CF may include a transparent resin layer disposed in a white pixel. The transparent layer OC covers the color filter CF and the light shielding layer BMA. The transparent layer OC is, for example, a transparent organic insulating layer.

The display part DA includes an area A1 where the color filter CF is disposed and an area A2 where no color filter CF is disposed. The transparent layer OC is disposed over the areas A1 and A2, and is in contact with the color filter CF in the area A1 and is in contact with the insulating substrate 20 in the area A2. The alignment films AL1 and AL2 are disposed over the areas A1 and A2.

The light receiving element PA may detect visible light, or infrared, or may sense the proximity of a detection target, may detect infrared reflected by a detection target, or may be a combination of the aforementioned sensors. The electronic equipment 100 may include, instead of the light receiving element PA, or in addition to the light receiving element PA, a light emitting element. The light emitting element may be a projection element which projects infrared to a detection target.

The light receiving element PA is disposed to overlap the opening OP2 of the case CS and is surrounded by the projection PP. The light receiving element PA overlaps, in the third direction Z, the cover glass CG, polarizer PL2, liquid crystal panel PNL, polarizer PL1 and second light guide LG2. Note that, a part of, or the entirety of the light receiving element PA overlaps the display area DA of the liquid crystal panel PNL in the third direction Z. That is, in the electronic equipment 100 including the liquid crystal panel PNL and the light receiving element PA, the light receiving element PA should be disposed in the deeper side than is the liquid crystal panel PNL when being viewed by a user of the electronic equipment 100.

Focusing on a positional relationship between the light receiving element PA and the display part DA as shown, it is noted that the light receiving element PA overlaps the area A2. That is, the color filter CF does not overlap the light receiving element PA.

The light receiving element PA receives visible light (for example, light in a range from 400 to 700 nm) passing through the cover glass CG, polarizer PL2, liquid crystal panel PNL, polarizer PL1, and second light guide LG2. If the absorption axis of the polarizer PL1 and the absorption axis of the polarizer PL2 are orthogonal to each other, transmissivity of the liquid crystal element LCD becomes minimum where the wavelength of the light passing the liquid crystal layer LC of the liquid crystal element LCD is $\lambda$, and retardation of the liquid crystal layer LC becomes approximately zero or $\lambda$. Thus, if a picture is taken with the light receiving element PA, the retardation of the liquid crystal layer LC is set to be greater than zero and be less than $\lambda$. If the retardation is approximately $\lambda/2$, the transmissivity of the liquid crystal element LCD becomes maximum.

The polarizer PL1 is adhered to the insulating substrate 10. The polarizer PL2 is adhered to the insulating substrate 20. The polarizer PL2 is adhered to the cover glass CG with a transparent adhesion layer AD. The polarizers PL1 and PL2 are disposed over the areas A1 and A2. Note that the polarizers PL1 and PL2 may include a retardation film, diffusion layer, reflection prevention layer, and the like, if necessary.

Furthermore, to prevent the liquid crystal layer LC from being influenced by an external electric field or the like, a transparent conductive film may be disposed between the polarizer PL2 and the insulating substrate 20. The transparent conductive film is formed of a transparent oxide conductor such as indium tin oxide (ITO) or indium zinc oxide (IZO). If a sensor is used for the light receiving element PA, and the transparent conductive film may cause decrease of the transmissivity of infrared, an area where the transparent conductive film is not formed may be provided with the area A2 overlapping the sensor to suppress the decrease of the transmissivity of the visible light. The area where the transparent conductive film is not formed may be widened than the area A2. In a position overlapping the light receiving element PA for visible light where the transmissivity of infrared is not an issue, a transparent conductive film may be formed. If the transparent conductive film is formed of a conductive resin having a higher transmissivity of infrared than the oxide conductive material, a transparent conductive film may be disposed in the area overlapping the light receiving element PA.

Furthermore, a super birefringence film may be provided with the polarizer PL1 or the polarizer PL2. The super birefringence film is known for depolarization (naturalization) of the transmissive light at the time when linear polarized light is incident, and thus, a picture including a picture target generating polarized light can be taken without unnaturalness. For example, if an electronic equipment 100 or the like is in the picture target of the light receiving element PA, since the electronic equipment 100 emits the linear polarized light, the brightness of the electronic equipment 100 as the picture target incident on the light receiving element PA changes based on an angular relationship between the polarizers PL1 and PL2 and the polarizer of the electronic equipment 100 as the picture target, and there may be unnaturalness at the time of taking a picture. However, with the super birefringence film in the polarizers PL1 and PL2, a change in the brightness causing the unnaturalness can be suppressed.

A preferred film exerting the super birefringence property is, for example, COSMOSHINE (registered trademark) of Toyobo Co., Ltd. The super birefringence property is, for example, 800 nm or more retardation in the inner surface direction with respect to visible light which is 500 nm.

Figure 5:
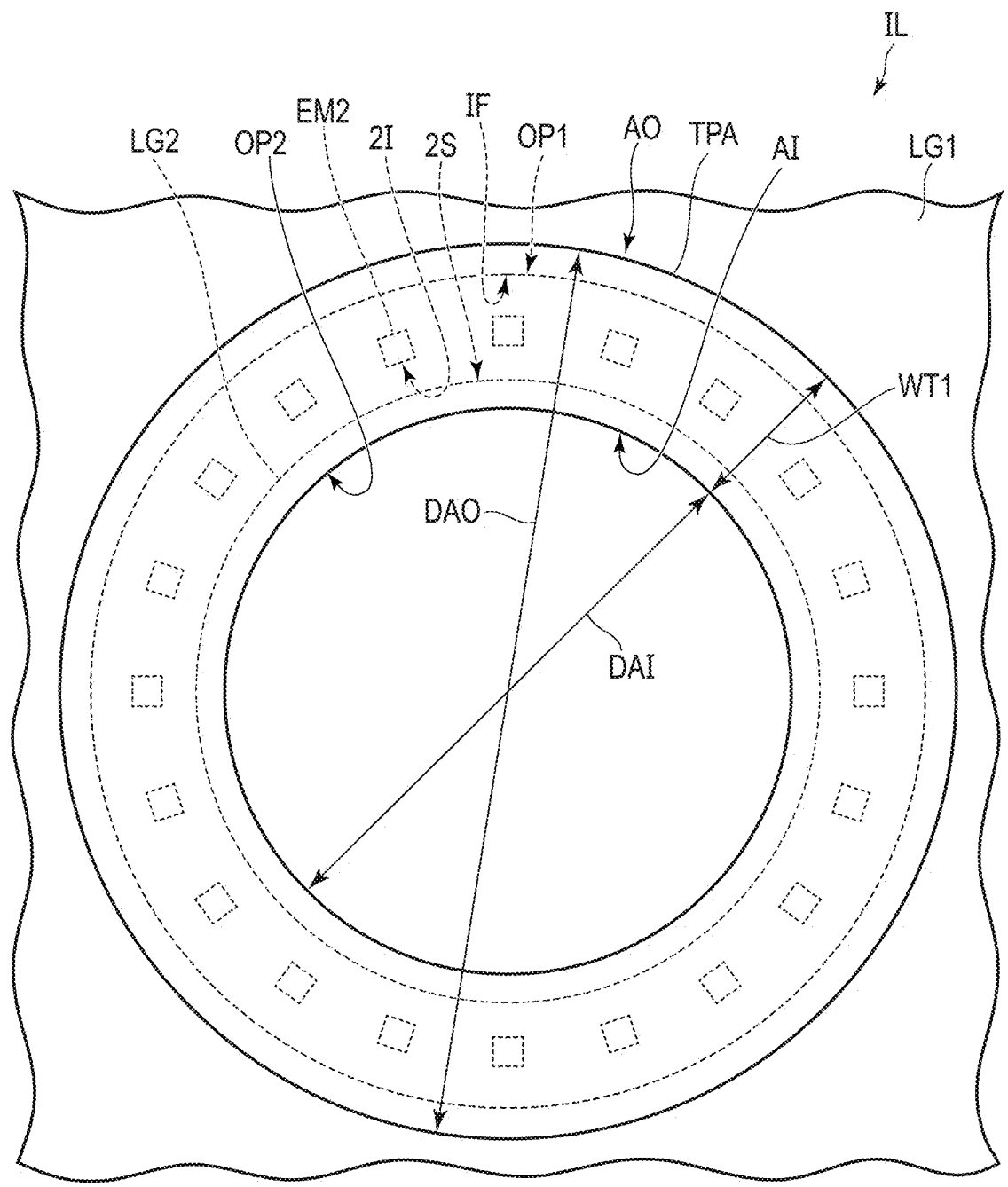
FIG. 5 is an enlarged plan view of the illumination device of the first embodiment, illustrating an adhesion part of FIG. 4.

In the illumination device IL, the reflection sheet RS, first light guide LG1, scattering sheet SS, prism sheet PS2, prism sheet PS3, first light source EM1, and wiring substrate F1 form a main illumination part. On the other hand, in the illumination device IL, the second light guide LG2, wavelength conversion element TS, prism sheet PS1, second light source EM2, and wiring substrate F2 form a sub illumination part. FIG. 5 illustrates the adhesion part TPA of FIG. 4, and is an enlarged plan view of the illumination device IL of the first embodiment. In this example, the light receiving element PA, prism sheet PS1, wavelength conversion element TS, wiring substrate F2, and light shielding tape BW are omitted from the depiction.

As in FIG. 5, the inner periphery AI is positioned inside the side surface 2S of the second light guide LG2, and the outer periphery AO is positioned outside the side surface IF of the first light guide LG1. The adhesion part TPA has a certain width WT1 in the diameter direction. In the example depicted, the width WT1 is approximately 1.0 mm, diameter DAI of the inner periphery TI is approximately 5.4 mm, and diameter DAO of the outer periphery AO is approximately 7.4 mm.

Figure 6:
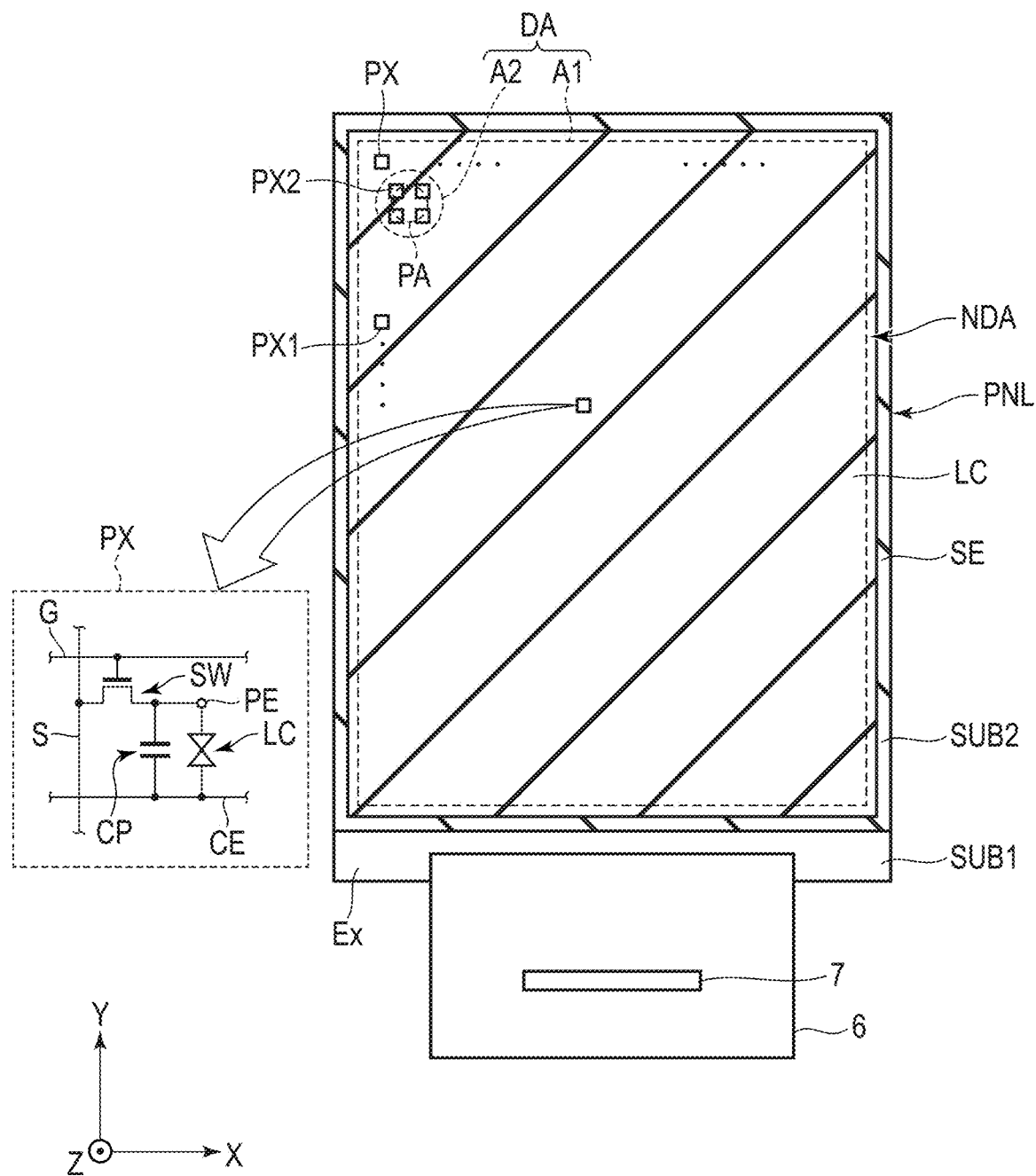
FIG. 6 is a plan view of an example of the structure of a liquid crystal panel of FIG. 5.

FIG. 6 is a plan view of an example of the structure of the liquid crystal panel PNL of FIG. 4. In FIG. 6, the liquid crystal layer LC and the sealant SE are hatched differently. The outer shape of the light receiving element PA is shown with a dashed line.

As in FIG. 6, the display part DA is a substantially quadrangle area which does not include a notch. Four corners may be round, and it may be a polygon or a circle other than a quadrangle. The display part DA is surrounded the sealant SE.

The liquid crystal panel PNL includes, in the display part DA, a plurality of pixels PX arranged in a matrix in the first direction X and the second direction Y. Each of pixels PX in the display part DA has the same circuit structure. As shown in FIG. 6 in an enlarged manner, each pixel PX includes, for example, a switching element SW, a pixel electrode PE, a common electrode CE, and the liquid crystal layer LC. The switching element SW is formed of, for example, a thin film transistor (TFT), and is electrically connected to a scanning line G and a signal line S. To the scanning line G, a control signal to control the switching element SW is supplied. To the signal line S, an image signal as a signal different from the control signal is supplied. The pixel electrode PE is electrically connected to the switching element SW. The liquid crystal layer LC is driven by a field produced between the pixel electrode PE and the common electrode CE. Capacitance CP is formed, for example, between an electrode with the same potential as the common electrode CE and an electrode with the same potential as the pixel electrode PE.

The wiring substrate 6 is mounted on an extension part Ex of the first substrate SUB1 to be electrically connected thereto. The IC chip 7 is mounted on the line substrate 6 to be electrically connected thereto. Note that the IC chip 7 may be mounted on the extension part Ex to be electrically connected thereto. The IC chip 7 includes, for example, a display driver which outputs signals necessary for the image display, and the like. The wiring substrate 6 is a flexible printed circuit which can be bent.

In the display part DA, the pixel PX1 which does not overlap the light receiving element PA corresponds to the pixel in the area A1 of FIG. 4, and includes the color filter CF. That is, the pixel PX1 can display red, green, or blue. Furthermore, if the pixel PX1 is a white pixel, the pixel PX1 can display white (or transparent), gray, or black. The pixels PX1 are arranged over the entirety of the area overlapping the first light guide LG1 in the display area DA.

Furthermore, the pixels PX1 may be arranged over the area of the area A2 which does not overlap the light receiving element PA.

In the display area DA, the pixel PX2 overlapping the light receiving element PA corresponds to the pixel in the area A2 of FIG. 4 and does not include a color filter CF. That is, the pixel PX2 is a monochrome display pixel which can display white (or transparent), gray, or black.

Furthermore, the light receiving element PA overlaps the liquid crystal panel PNL. Specifically, the light receiving element PA overlaps the display part DA of the liquid crystal panel PNL. Thus, the display part DA can be enlarged. Furthermore, since a space to include the light receiving element PA is not required in the non-display part NDA, the bezel width of the non-display part NDA can be reduced.

Figure 7:
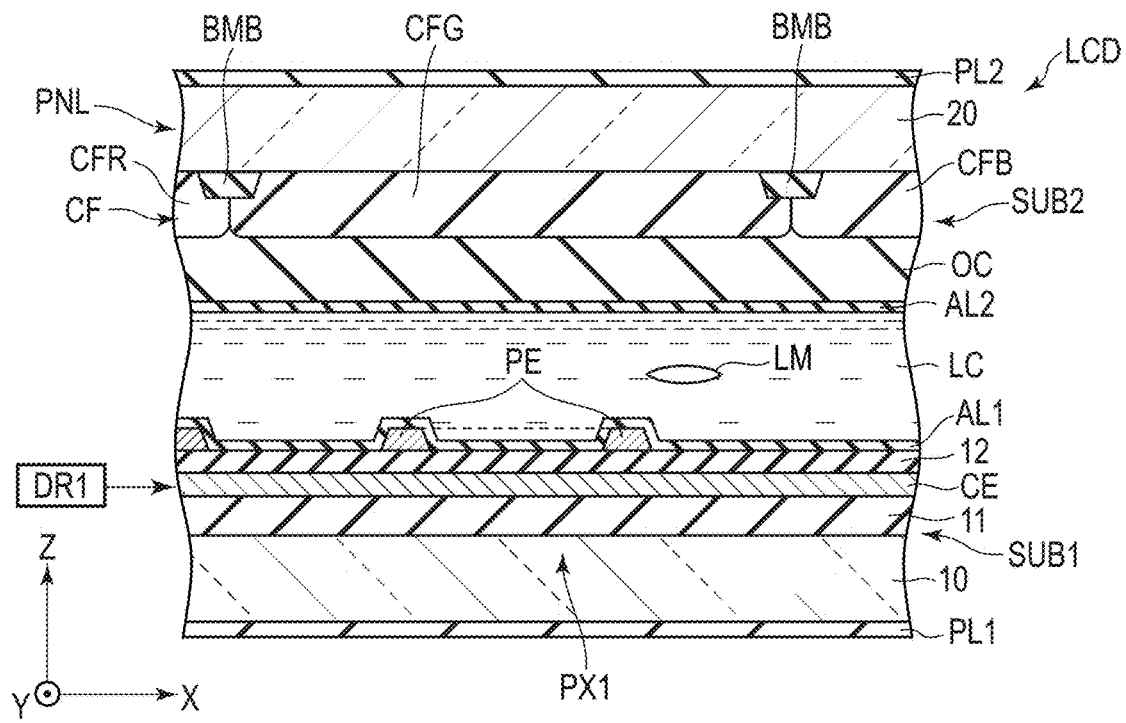
FIG. 7 is a cross-sectional view of a liquid crystal element including a pixel PX1 of FIG. 6.

FIG. 7 is a cross-sectional view of the liquid crystal element LCD including the pixel PX1 of FIG. 6.

In this example, the liquid crystal element LCD including a liquid crystal panel PNL corresponding to a display mode using the horizontal field between the polarizer PL1 and the polarizer PL2 will be explained. As in FIG. 7, the first substrate SUB1 includes, between the insulating substrate 10 and the alignment film AL1, insulating layers 11 and 12, the common electrode CE, and the pixel electrode PE. Note that the scanning line G, signal line S, and switching element SW shown in FIG. 6 are positioned between the insulating substrate 10 and the common electrode CE, for example. The common electrode CE is positioned above the insulating layer 11 and is covered with the insulating layer 12. The pixel electrode PE is positioned above the insulating layer 12, and is covered with the alignment film ALL Each of the pixel electrode PE is opposed to the common electrode CE through the insulating layer 12. The common electrode CE and the pixel electrode PE are formed of a transparent conductive material such as ITO or IZO. The pixel electrode PE is a linear electrode, and the common electrode CE is a flat-plate-like electrode provided commonly with a plurality of pixels PX1. Note that, the pixel electrode PE may be formed as a flat-panel-like shape electrode, and a linear common electrode may be disposed between the pixel electrode PE and the liquid crystal layer LC. Although this is not described in detail, the insulating layer 11 includes an inorganic insulating layer and an organic insulating layer. The insulating layer 12 is an inorganic insulating layer such as silicon nitride.

In the second substrate SUB2, the light shielding layer BMB is formed integrally with the light shielding layer BMA of the non-display part NDA of FIG. 4. The color filter CF includes a read colored layer CFR, green colored layer CFG, and blue colored layer CFB. The green colored layer CFG is opposed to the pixel electrode PE. Each of the red colored layer CFR and the blue colored layer CFB is opposed to another pixel electrode PE which is not shown.

The driver DR1 configured to drive the liquid crystal element LCD includes, for example, a scanning line drive circuit which is electrically connected to the scanning line G of FIG. 6, and a signal line drive circuit which is electrically connected to the signal line S. The driver DR1 outputs signals required for image display with respect to each pixel PX in the display part DA, and controls the transmissivity of the liquid crystal element LCD. The transmissivity of the liquid crystal element LCD is controlled based on the size of the voltage applied to the liquid crystal layer LC.

For example, in an off state where a voltage is not applied to the liquid crystal layer LC in the pixel PX1, liquid crystal molecules LM included in the liquid crystal layer LC are in the initial alignment in a predetermined direction between the alignment films AL1 and AL2. In such an off state, the light guided in the pixel PX1 from the first light source EM1 of FIG. 2 is absorbed by the polarizers PL1 and PL2. Thus, the liquid crystal element LCD displays black in the pixel PX1 in the off state.

On the other hand, in an on state where a voltage is applied to the liquid crystal layer LC, the liquid crystal molecules LM are aligned in a direction different from the initial alignment direction by the electric field produced between the pixel electrode PE and the common electrode CE, and the alignment direction thereof is controlled by the electric field. In such an on state, the light guided into the pixel PX1 partially passes through the polarizers PL1 and PL2. Thus, the liquid crystal element LCD displays, in the pixel PX1 in the on state, a color corresponding to the color filter CF.

The above-mentioned example corresponds to a normally black mode in which black is displayed in an off state; however, a normally white mode in which black is displayed in an on state (displays white in an off state) may be applied instead.

Figure 8:
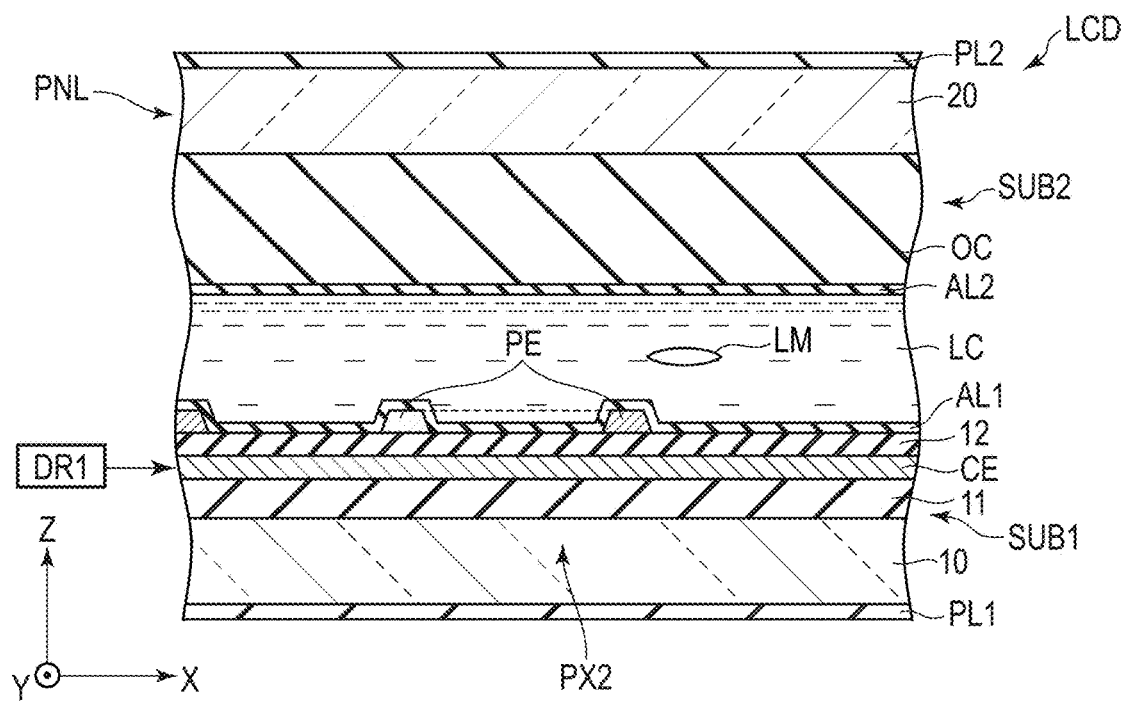
FIG. 8 is a cross-sectional view of the liquid crystal element including a pixel PX2 of FIG. 6.

FIG. 8 is a cross-sectional view of the liquid crystal element LCD including the pixel PX2 of FIG. 6.

As in FIG. 8, the pixel PX2 does not include a color filter CF or a light shielding layer BMB in the second substrate SUB2, and in this respect, the pixel PX2 differs from the pixel PX1 of FIG. 7. That is, the transparent layer OC is in contact with the insulating substrate 20 immediately above the pixel electrode PE. Note that a transparent resin layer may be interposed between the transparent layer OC and the insulating substrate 20 to adjust the thickness of the transparent layer OC.

The transmissivity of the liquid crystal element LCD in the pixel PX2 is controlled by the driver DR1 as with the pixel PX1. That is, the liquid crystal element LCD exerts the minimum transmissivity and displays black in the pixel PX2 in the off state where no voltage is applied to the liquid crystal layer LC as with the pixel PX1.

On the other hand, in the on state where a voltage is applied to the liquid crystal layer LC, the light guided into the pixel PX2 partially passes through the polarizers PL1 and PL2. The liquid crystal element LCD displays white or becomes transparent in the pixel PX2 in the on state where the transmissivity is the maximum. Furthermore, as described above, the liquid crystal element LCD may be controlled to be a middle transmissivity between the minimum transmissivity and the maximum transmissivity to display gray. Note that, in FIG. 8, the common electrode CE is formed in a flat plate shape, and there may be an opening in the common electrode CE in the pixel PX2.

Furthermore, if the pixel electrode PE is disposed closer to the insulating substrate 10 than is the common electrode CE, the opening may be provided with the pixel electrode PE. Furthermore, the pixel electrode PE and the common electrode CE may be linear electrodes. In that case, both the linear pixel electrode PE and the linear common electrode CE can be disposed in the same layer. Furthermore, the pixel electrode PE and the common electrode CE may be disposed in the different layers with an insulating layer interposed therebetween. If a liquid crystal lens is formed using the liquid crystal layer LC, the freedom of the lens characteristics can be increased further with the lens formed of the linear pixel electrode PE and the linear common electrode CE than with the lens formed of a flat plate electrode and a linear electrode.

Now, an illumination device IL of a second embodiment will be explained with reference to FIGS. 9 to 11.

Figure 9:
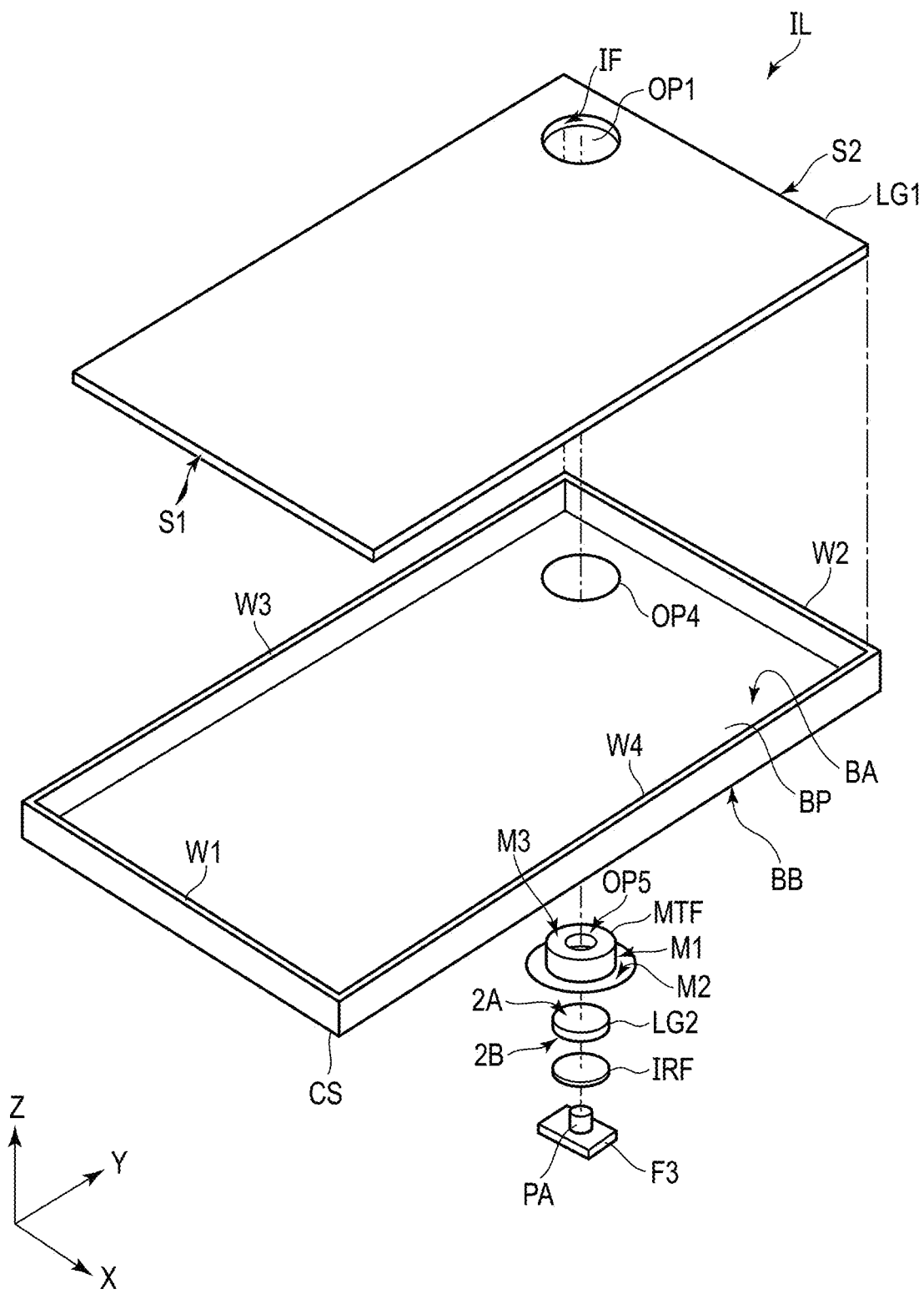
FIG. 9 is an exploded perspective of an illumination device of a second embodiment.

FIG. 9 is an exploded perspective of the illumination device IL of the second embodiment. In this example, a light receiving element PA is, for example, a detection element to detect infrared reflected by a detection target.

As in FIG. 9, in the second embodiment, the illumination device IL further includes a metal frame MTF and an infrared transmissive film IRF, and the case CS does not include the projection PP and the openings OP2 and OP3, and in this respect, the second embodiment differs from the illumination device IL of the first embodiment of FIG. 1.

The bottom plate BP includes a second opening OP4. The second opening OP4 overlaps the first opening OP1 in the third direction Z. The second opening OP4 is a through hole passing through the bottom plate BP in the third direction Z. In the example depicted, the second opening OP4 is substantially the same size as the first opening OP1 in the X-Y plan.

The metal frame MTF includes a cylinder part M1, brim part M2 formed continuously from an end of the cylinder part M1 in a ring shape, and top plate M3 formed continuously from the other end of the cylinder part M1 and having an opening OP5. The cylinder part M1 and the top plate M3 overlap the first opening OP1 and the second opening OP4 in the third direction Z. The infrared transmissive film IRF is positioned between the second light guide LG2 and the light receiving element PA. The infrared transmissive film IRF overlaps each of the first opening OP1 and the second opening OP4 in the third direction Z.

Figure 10:
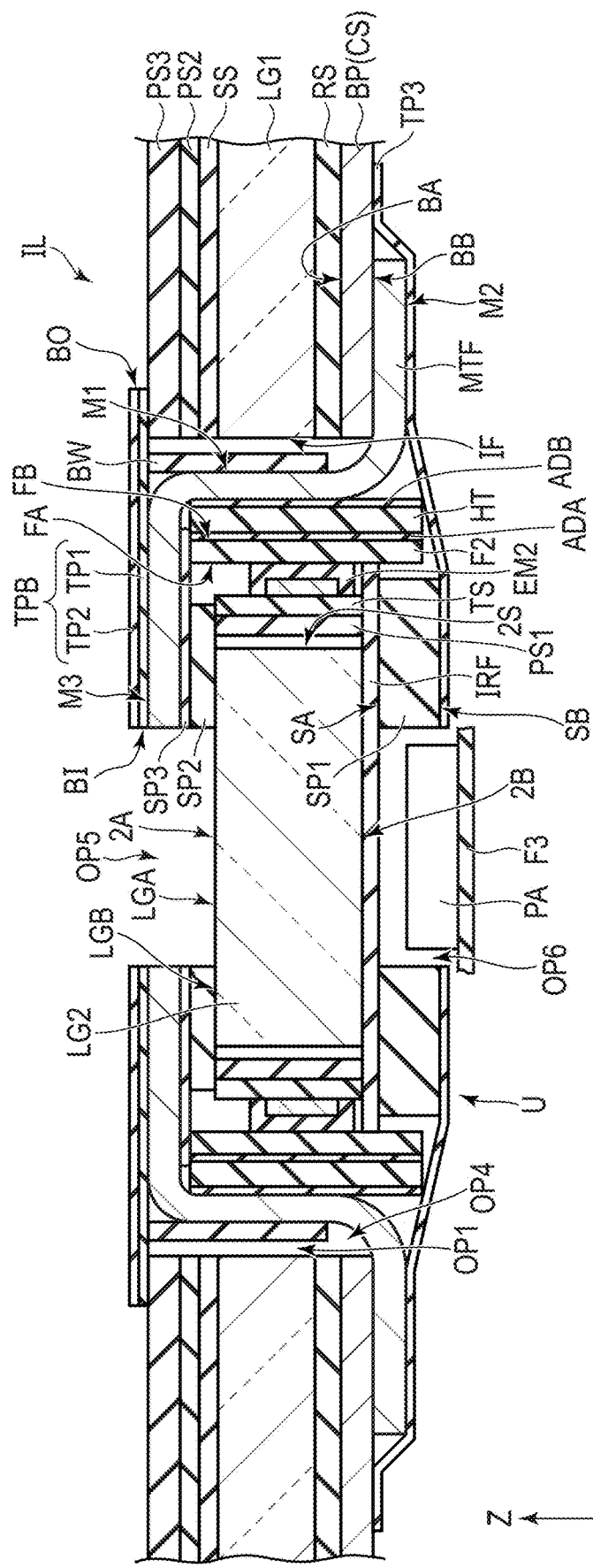
FIG. 10 is a cross-sectional view of the illumination device and a light receiving element of the second embodiment of FIG. 9.

FIG. 10 is a cross-sectional view of the illumination device IL and the light receiving element PA of the second embodiment of FIG. 9.

As in FIG. 10, the illumination device IL further includes spacers SP1 to SP3, a tape TP3, a heat conductive layer HT, a first adhesion layer ADA, a second adhesion layer ADB, and an adhesion part TPB. The top plate M3 of the metal frame MTF overlaps the area LGB of the second light guide LG2. The opening OP5 of the top plate M3 overlaps the area LGA of the second light guide LG2. The cylinder part M1 is positioned in the first opening OP1 of the first light guide LG1, and is positioned between the wiring substrate F2 and the first light guide LG1. The brim part M2 is in contact with the second surface BB of the bottom plate BP. The metal frame MTF is formed of a metal of good heat conductivity such as copper or aluminum.

The spacer SP1 is positioned between the infrared transmissive film IRF and the tape TP3. The spacer SP1 includes a main surface SA, a main surface SB opposite to the main surface SA, and an opening OP6, and is formed in a cylinder. The main surface SA is in contact with the infrared transmissive film IRF, and the main surface SB is adhered to the tape TP3. The opening OP6 overlaps the opening OP5 in the third direction Z.

Each of the spacers SP2 and SP3 is disposed between the second light guide plate LG2 and the top plate M3, and is formed in a ring shape. The spacer SP2 is in contact with the first main surface 2A in the area LGB. The spacer SP3 is positioned between the wiring substrate F2 and the top plate M3. The spacers SP1 to SP3 are formed of a resin material, for example.

The heat conductive layer HT is positioned between the wiring substrate F2 and the cylinder part M1, and is formed as a cylinder surrounding the wiring substrate F2. The heat conductive layer HT is formed of graphite, for example. The first adhesion layer ADA is positioned between the heat conductive layer HT and the adhesive surface FB and adheres the heat conductive layer HT and the adhesive surface FB. The second adhesion layer ADB is positioned between the cylinder part M1 and the heat conductive layer HT to adhere the cylinder part M1 and the heat conductive layer HT. In the example depicted, the first adhesion layer ADA and the second adhesion layer ADB are formed in a ring shape. The light shielding tape BW is positioned between the cylinder part M1 and the side surface IF of the first light guide LG1 and adheres to the cylinder part M1.

The infrared transmissive film IRF reflects the visible light and passes the infrared. For example, the infrared transmissive film IRF reflects the visible light of 520 to 750 nm while passing the infrared of 800 nm or more. Note that the reflection wavelength range and the transmission wavelength range of the infrared transmissive film IRF are not limited to the above-mentioned examples, and for example, the reflection wavelength range may be expanded to 380 to 750 nm. The infrared transmissive film IRF is positioned inside the wiring substrate F2, and covers the entirety of the second main surface 2B of the second light guide LG2. The light receiving element PA is positioned in the opening OP6. For example, the detection target wavelength of the light receiving element PA is 940 nm. The light receiving element PA receives the infrared through the liquid crystal panel PNL (cf. FIG. 4), second light guide LG2, and infrared transmissive film IRF.

The adhesion part TPB includes the first tape TP1 and the second tape TP2 as with the adhesion part TPA of FIG. 4, and is positioned between the liquid crystal panel PNL and the illumination device IL to adhere the illumination device IL and the liquid crystal panel PNL. The adhesion part TPB is formed in a ring shape and has an inner periphery BI and an outer periphery BO. The inner periphery BI overlaps the top plate M3 and does not overlap the light receiving element PA. The outer periphery BO overlaps the first light guide LG1.

The second light guide LG2, second light sources EM2, infrared transmissive film IRF, heat conductive layer HT, spacers SP1 to SP3, and the like are accommodated in the cylinder part M1 of the metal frame MTF to form one unit U. In the example depicted, the tape TP3 adheres to the second surface BB, brim part M2, heat conductive layer HT, and main surface SB, and the first tape TP1 adheres to the top plate M3, light shielding tape BW, and an upper surface of prism sheet PS3. The unit U is fixed in the first opening OP1 by the first tape TP1 and the tape TP3.

The second light guide LG2, second light sources EM2, infrared transmissive film IRF, and the like can be formed in the cylinder part M1 as one unit U to be disposed in the first opening OP1 of the first light guide LG1. Thus, as compared to a case where the second light guide LG2, second light sources EM2, infrared transmissive film IRF, and the like are formed in the first opening OP1, the manufacturing method can be simplified and the productivity can be increased.

In general, light emitted from LED does not contain heat while the LED itself generates heat. The heat of the LED must be radiated, or else, the heated part of the LED may be deteriorated, and the brightness of the light emitted from the LED decreases because of insufficient flow of current to the LED. In the illumination device IL of the second embodiment, the heat conductive layer HT is adhered to the wiring substrate F2 including the second light sources EM2 via the first adhesion layer ADA, and the heat conductive layer HT is adhered to the cylinder part M1 of the metal frame MTF via the second adhesion layer ADB, and the brim part M2 of the metal frame MTF is adhered to the second surface BB of the bottom plate BP. Thus, the heat of the second light sources EM2 themselves can be released through a radiation path formed of the heat conductive layer HT, metal frame MTF, and bottom plate BP, and thus, undesired deterioration of the second light sources EM2 can be suppressed.

Figure 11:
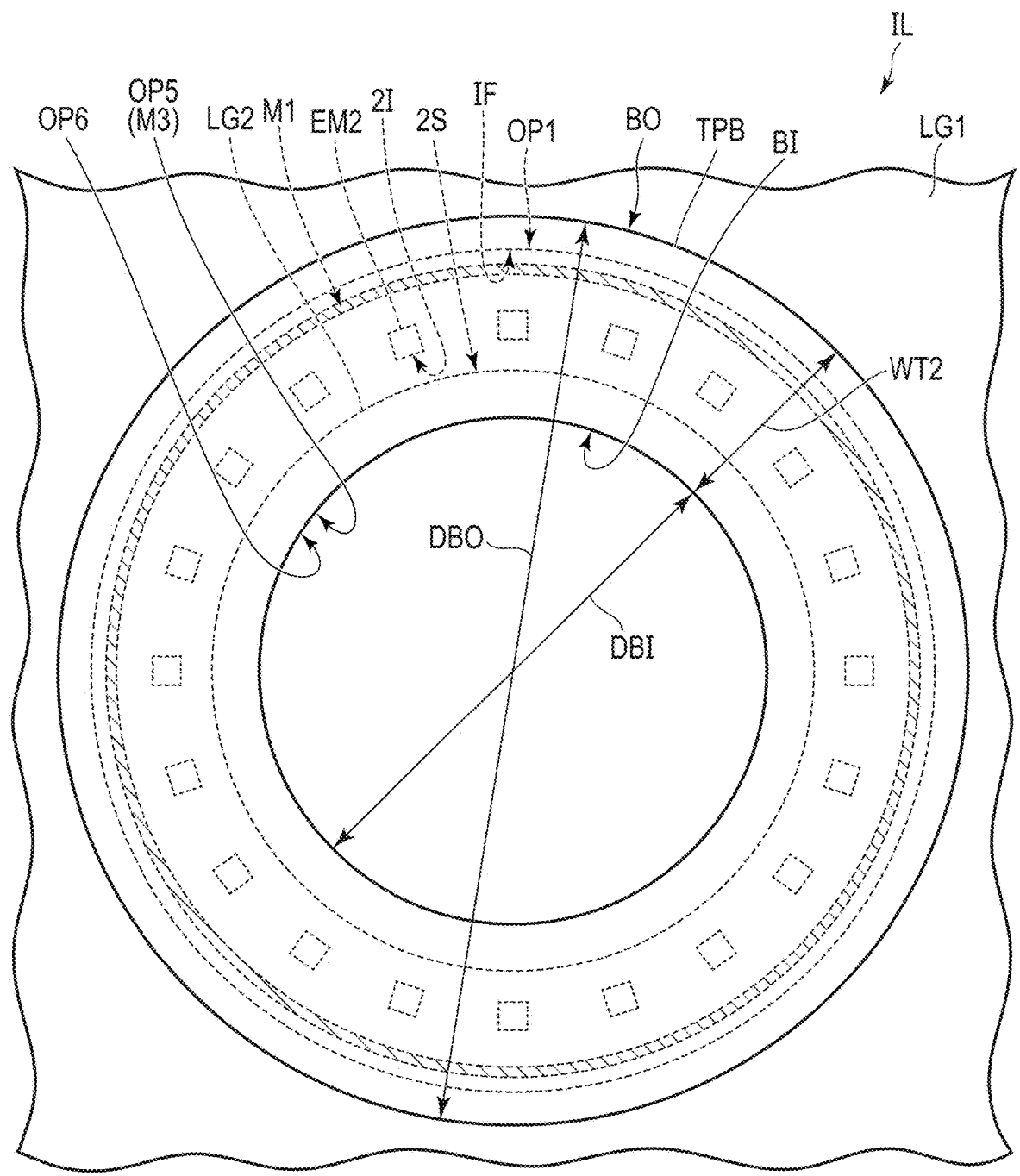
FIG. 11 is an enlarged plan view of the illumination device of the second embodiment, illustrating an adhesion part of FIG. 10.

FIG. 11 illustrates the adhesion part TPB of FIG. 10, and is an enlarged plan view of the illumination device IL of the second embodiment. In this example, the first light guide LG1, second light guide LG2, second light source EM2, metal frame MTF, and adhesion part TPB are shown. Note that the metal frame MTF is shown as the cylinder part M1 and the opening OP5 of the top plate M3 alone, and the cylinder part M1 is shown as dot pattern.

As in FIG. 11, the cylinder part M1 is positioned between the second light source EM2 and the side surface IF of the first light guide LG1. The inner periphery BI is positioned inside the side surface 2S which is a light intake surface (surface on which the light emitted from the second light source EM2 is incident) of the second light guide LG2. The inner periphery BI is formed along the opening OP5 and is not positioned in the opening OP5. The outer periphery BO is positioned outside the first opening OP1. The adhesion part TPB has a predetermined width WT2 in the diameter direction. In the example depicted, the width WT2 is approximately 1.3 mm, diameter DBI of the inner periphery BI is approximately 5.0 mm, and diameter DBO of the outer periphery BO is approximately 7.6 mm.

Now, an illumination device IL of a third embodiment will be explained with reference to FIGS. 12 to 14.

Figure 12:
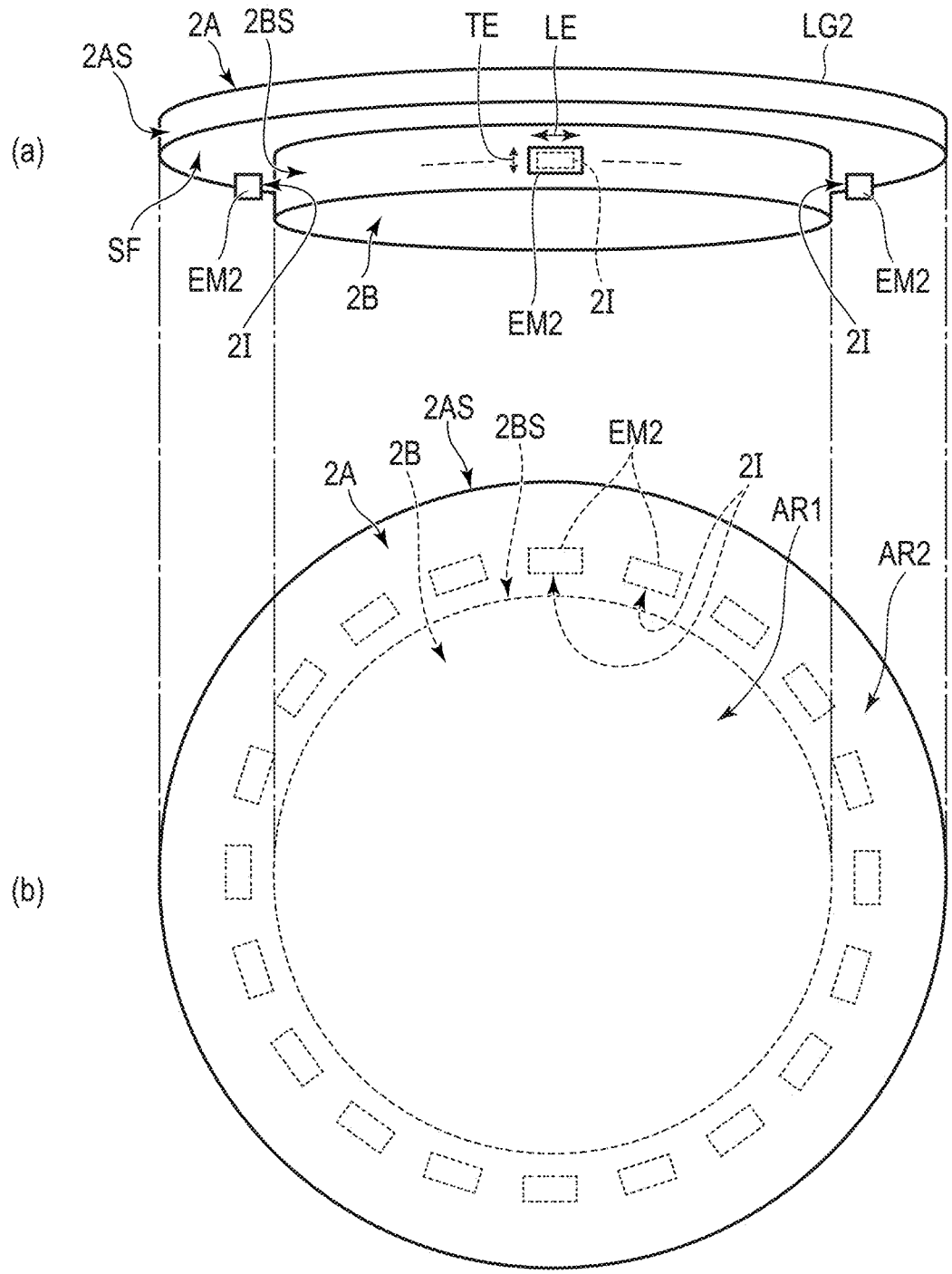
FIG. 12 illustrates an illumination device of a third embodiment in which a second light guide and a second light source are shown.

FIG. 12 illustrates the illumination device IL of the third embodiment, and illustrates a second light guide LG2 and second light sources EM2. FIG. 12($a$) is a perspective view including a plurality of second light sources EM2 and the second light guide LG2, and FIG. 12($b$) is a plan view including the second light sources EM2 as being viewed from a first main surface 2A to a second main surface 2B of the second light guide LG2, and the second light guide LG2.

As in FIG. 12, the illumination device IL of the third embodiment has a shape of the second light guide LG2 different from that of the illumination device IL of the above-described embodiments.

The second light guide LG2 includes a first area AR1, a second area AR2, a first main surface 2A, a second main surface 2B, a first side surface 2AS, a second side surface 2BS, and a continuous surface SF.

The second area AR2 surrounds the first area AR1. In the example depicted, the first area AR1 is circular; however, it may be a different shape such as ovally rounded rectangle or polygon. The first main surface 2A extends over the entirety of the first area AR1 and the entirety of the second area AR2. The second main surface 2B extends to the first area AR1 alone and is positioned in the opposite side of the first main surface 2A. In a plan view, the second main surface 2B is positioned inside the first main surface 2A.

The first side surface 2AS is continuous from the first main surface 2A, and the second side surface 2BS is continuous from the second main surface 2B, and the continuous surface SF is continuous from each of the first main surface 2A and the second main surface 2B. The second side surface 2BS is positioned inside the first side surface 2AS in a plan view. In the example depicted, the second side surface 2BS corresponds to a boundary between the first area AR1 and the second area AR2.

The second light source EM2 is positioned between the first side surface 2AS and the second side surface 2BS. The second light source EM2 is opposed to each of the continuous surface SF and the second side surface 2BS between the first main surface 2A and the second main surface 2B. The light emitting surface 21 of the second light source EM2 is opposed to the second side surface 2BS, and the second light source EM2 emits light to the second side surface 2BS. The second light sources EM2 are arranged to surround the second side surface 2BS. The second light source EM2 has a length TE in a short direction of the light emitting surface 21. The length TE is approximately 0.2 mm.

Figure 13:
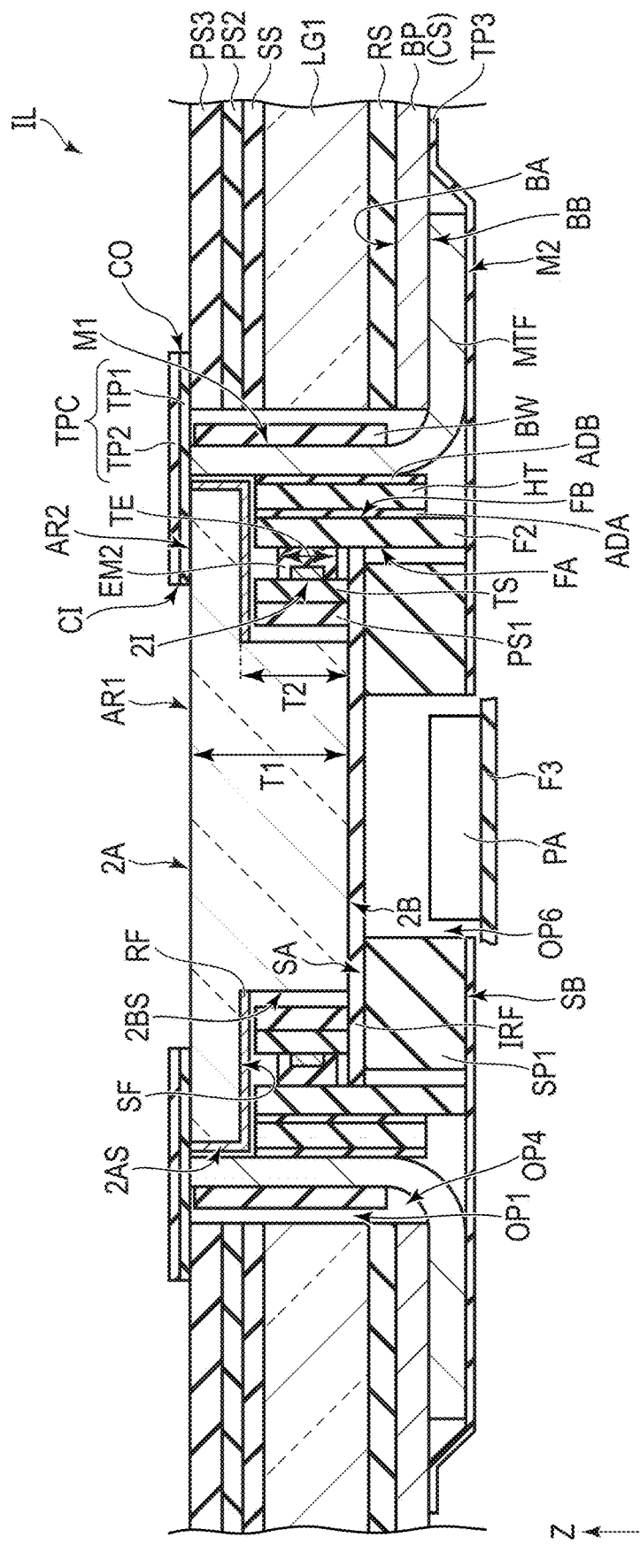
FIG. 13 is a cross-sectional view of the illumination device and a light receiving element of the third embodiment.

FIG. 13 is a cross-sectional view of the illumination device IL and the light receiving element PA of the third embodiment.

As in FIG. 13, the illumination device IL further includes a light reflective layer RF and the adhesion part TPC. The adhesion part TPC includes, as with the adhesion part TPA of FIG. 4, the first tape TP1 and the second tape TP2, is positioned between the liquid crystal panel PNL (cf. FIG. 4) and the illumination device IL to adhere the illumination device IL and the liquid crystal panel PNL. The adhesion part TPC is formed in a ring shape and has an inner periphery CI and an outer periphery CO. The inner periphery CI overlaps the continuous surface SF, and the outer periphery CO overlaps the first light guide LG1.

The light reflective layer RF covers the continuous surface SF and the first side surface 2AS. In the example depicted, the light reflective layer RF covers the entirety of the continuous surface SF and the entirety of the first side surface 2AS. The light reflective layer RF is formed by depositing silver, for example, and reflects light. The light reflective layer RF is apart from each of the cylinder part M1, heat conductive layer HT, wiring substrate F2, second light source EM2, wavelength conversion element TS, and prism sheet PS1.

The cylinder part M1 is positioned between the heat conductive layer HT and the first light guide LG1 in the first opening OP1. The wiring substrate F2 is positioned between the first side surface 2AS and the second side surface 2BS in the second direction Y, and the mount surface FA is opposed to the second side surface 2BS. The infrared transmissive film IRF extends between the first side surface 2AS and the second side surface 2BS. The second light source EM2, wavelength conversion element TS, and prism sheet PS1 are positioned between the continuous surface SF and the infrared transmissive film IRF. Note that, the second light source EM2 is not positioned closer to the light receiving element PA than is the second main surface 2B in the third direction Z. The wavelength conversion element TS is positioned between the second side surface 2BS and the light emitting surface 21 of the second light source EM2. In the example depicted, the second light source EM2 is arranged such that the short direction of the light emitting surface 21 is parallel to the third direction Z. The second light guide LG2 has a thickness T2. The thickness T2 is a length from the second main surface 2B to the continuous surface SF in the third direction Z. The thickness T2 is approximately 0.4 mm.

Figure 14:
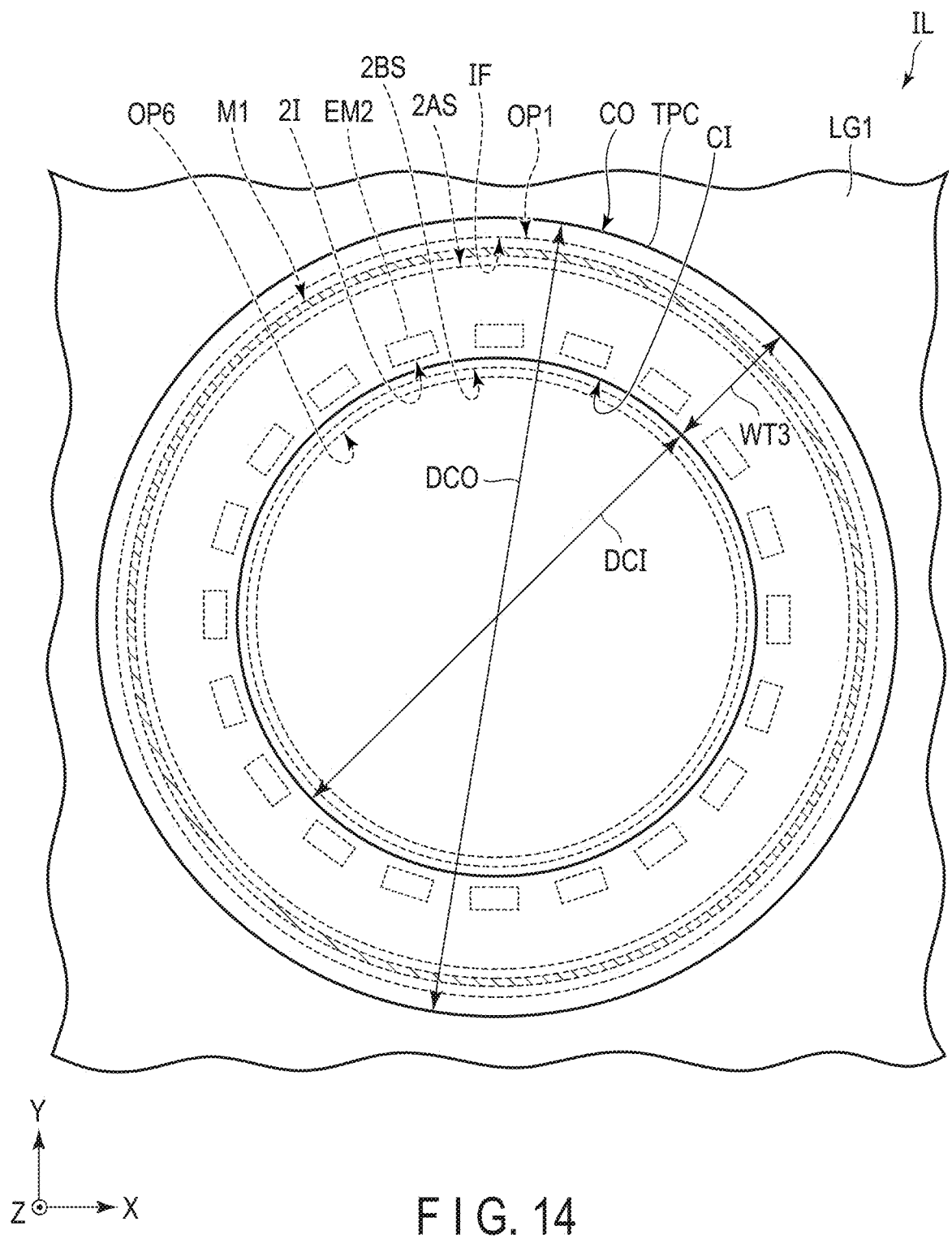
FIG. 14 is an enlarged plan view of the illumination device of the third embodiment, illustrating an adhesion part of FIG. 13.

FIG. 14 illustrates the adhesion part TPC of FIG. 13, and is an enlarged plan view of the illumination device IL of the third embodiment.

As in FIG. 14, the inner periphery CI is positioned between the second side surface 2BS and the first side surface 2AS. The inner periphery CI is positioned outside the second side surface 2BS which is a light intake surface (surface on which the light emitted from the second light source EM2 is incident) of the second light guide LG2. The outer periphery CO is positioned outside the first opening OP1. The adhesion part TPC has a predetermined width WT3 in the diameter direction. In the example depicted, the width WT3 is approximately 0.7 mm, diameter DCI of the inner periphery CI is approximately 5.4 mm, and diameter DCO of the outer periphery CO is approximately 6.8 mm. The width WT3 is narrower than the width WT2 of the second embodiment and the width WT1 of the first embodiment, and the diameter DCO is narrower than the diameter DBO of the second embodiment and the diameter DAO of the first embodiment.

In the illumination device IL of the third embodiment, each of the continuous surface SF and the first side surface 2AS of the second light guide LG2 is covered with the light reflective layer RF. The light reflective layer RF is formed by evaporating silver. Light emitted from the second light source EM2, wavelength conversion element TS, and prism sheet PS1 partially proceeds to the continuous surface SF to be reflected thereupon. Thus, light leakage from the second light source EM2 and the like can be suppressed with respect to a user of the electronic equipment 100, and the adhesion part TPC is not required to cover the light intake surface (second side surface 2BS) of the second light guide LG2. Thus, as compared to the first and second embodiments, the width WT3 of the adhesion part TPC and the diameter DCO can be narrowed, and a non-lit area in the display part DA can be reduced. Furthermore, the top plate M3 of the metal frame MTF is not required to suppress the light leakage from the second light source EM2 and the like as in the second embodiment, the metal frame MTF of the third embodiment does not include a top plate M3. Thus, the thickness of the illumination device IL in the third direction Z can be thinner.

Furthermore, the infrared transmissive film IRF is positioned between the second light guide LG2 and the light receiving element PA (infrared sensor), and covers the second main surface 2B of the second light guide LG2. The infrared transmissive film IRF passes infrared of detection target wavelength of the light receiving element PA (infrared sensor), and reflects the visible light.

If the light receiving element PA (infrared sensor) is used while the second light source EM2 is not turned on, the light passing through the liquid crystal element LCD incidents on the second light guide LG2 from the first main surface 2A, travels in the second light guide LG2 to reach the second main surface 2B. Out of the light reaching the second main surface 2B, the infrared of the detection target wavelength of the light receiving element PA (infrared sensor) passes the infrared transmissive film IRF to be received and detected by the light receiving element PA (infrared sensor).

If the light receiving element PA (infrared sensor) is not used while the second light source EM2 is turned on, the light emitted from the second light source EM2 is incident on the second light guide LG2 from the second side surface 2BS through the wavelength conversion element TS and the prism sheet PS1, and travels in the second light guide LG2. Out of the light reaching the second main surface 2B, the visible light is reflected by the infrared transmissive film IRF to proceed in the second light guide LG2. Thus, the brightness of the illumination light in the area A2 can be increased as compared to a case where light proceeding in the second light guide LG2 leaks from the second main surface 2B to the light receiving element PA (infrared sensor) side. Furthermore, out of the light proceeding in the second light guide LG2, the light reaching the first side surface 2AS and the continuous surface SF is reflected by the light reflective layer RF, and proceeds in the second light guide LG2. The brightness of the illumination light in the area A2 can be increased as compared to a case where light proceeding in the second light guide LG2 leaks from the first side surface 2AS and the continuous surface SF. Furthermore, since the infrared of the light reaching the second main surface 2B leaks from the second main surface 2B to the light receiving element PA (infrared sensor) side through the infrared transmissive film IRF, radiation heat of the infrared in the opening OP1 can be suppressed.

Furthermore, one surface of the head conductive layer HT is adhered to the wiring substrate F2 where the second light sources EM2 are mounted via the first adhesion layer ADA while the other surface of the heat conductive layer HT is adhered to the cylinder part M1 of the metal frame MTF via the second adhesion layer ADB, and the brim part M2 of the metal frame MTF is adhered to the second surface BB of the bottom plate BP. Thus, the heat of the second light source EM2 itself can be released through a radiation path formed of the heat conductive layer HT, metal frame MTF, and bottom plate BP, and undesirable deterioration of the second light source EM2 can be suppressed.

As described above, in the present embodiments, an illumination device with a narrower non-lit area in an display part and with increased illumination brightness, and an electronic equipment including such an illumination device can be achieved.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

For example, if the light receiving element PA of the illumination device IL of the second embodiment or the third embodiment is a visible light detection sensor instead of the infrared sensor, the illumination device IL may not include an infrared transmissive film IRF.

What is claimed is:

1. An electronic equipment comprising:
a liquid crystal panel;
an illumination device configured to illuminate the liquid crystal panel; and
a light receiving element,
the illumination device including:
a first light guide which includes a first opening and is opposed to the liquid crystal panel;
a first light source configured to irradiate light to the first light guide;
a second light guide including a first area, a second area surrounding the first area, a first main surface extending over the entirety of the first area and the entirety of the second area, a second main surface extending the first area alone and positioned in the opposite side of the first surface, a first side surface continuous from the first main surface, a second side surface positioned inside the first side surface in a plan view and continuous from the second main surface, and a continuous surface continuous from each of the first side surface and the second side surface, the second light guide positioned in the first opening between the liquid crystal panel and the light receiving element;
a second light source opposed to each of the continuous surface and the second side surface between the first main surface and the second main surface to irradiate light onto the second side surface, and
a light reflective layer covering each of the continuous surface and the first side surface.

2. The electronic equipment of claim 1, wherein the light reflective layer covers the entirety of the continuous surface and the entirety of the first side surface.

3. The electronic equipment of claim 2, wherein the light reflective layer is formed of silver.

4. The electronic equipment of claim 1, wherein the light reflective layer is formed of silver.

5. The electronic equipment of claim 1, wherein the illumination device further includes a wavelength conversion element positioned between the second side surface and the second light source, the wavelength conversion element configured to convert the wavelength of the light emitted from the second light source.

6. The electronic equipment of claim 1, wherein the illumination device further includes a wiring substrate which is opposed to the second side surface, includes a mount surface on which the second light source is mounted, and is cylindrical, and
the wiring substrate is positioned between the first side surface and the second side surface.

7. The electronic equipment of claim 6, wherein the wiring substrate includes an adhesive surface in the opposite side of the mount surface, and
the illumination device further includes a heat conductive layer which surrounds the wiring substrate and is cylindrical, and a first adhesive layer positioned between the heat conductive layer and the adhesive surface to adhere the heat conductive layer and the adhesive surface.

8. The electronic equipment of claim 7, wherein the heat conductive layer is formed of graphite.

9. The electronic equipment of claim 8, wherein the illumination device further includes
a case including a bottom plate having a first surface opposed to the first light guide, a second surface which is in the opposite side of the first surface, and a second opening overlapping the first opening,
a metal frame including a cylinder part positioned between the heat conductive layer and the first light guide in the first opening and a brim part which is continuous from the cylinder part and is in a ring shape, and
a second adhesive layer positioned between the cylinder part and the heat conductive layer to adhere the cylinder part and the heat conductive layer, and
the brim part is in contact with the second surface.

10. The electronic equipment of claim 9, wherein the illumination device further includes a light shielding tape positioned between the cylinder part and the first light guide in the first opening to be adhered to the cylinder part.

11. The electronic equipment of claim 7, wherein the illumination device further includes
a case including a bottom plate having a first surface opposed to the first light, a second surface which is in the opposite side of the first surface, and a second opening overlapping the first opening,
a metal frame including a cylinder part positioned between the heat conductive layer and the first light guide in the first opening and a brim part which is continuous from the cylinder part and is in a ring shape, and
a second adhesive layer positioned between the cylinder part and the heat conductive layer to adhere the cylinder part and the heat conductive layer, and
the brim part is in contact with the second surface.

12. The electronic equipment of claim 11, wherein the illumination device further includes a light shielding tape positioned between the cylinder part and the first light guide in the first opening to be adhered to the cylinder part.

13. The electronic equipment of claim 1, wherein the illumination device further includes an adhesive part positioned between the liquid crystal panel and the illumination device to adhere the liquid crystal panel and the illumination device, the adhesive part including, in a plan view, an inner periphery positioned between the second side surface and the first side surface and an outer periphery positioned outside the first opening, the adhesive part formed in a ring shape, and
the adhesive part includes a first tape which is light reflective and is in a ring shape, and a second tape positioned between the first tape and the liquid crystal panel to overlap the entirety of the first tape in a plan view to block the light.

14. The electronic equipment of claim 1, wherein the illumination device further includes an infrared transmissive film positioned between the second light guide and the light receiving element, the infrared transmissive film configured to cover the entirety of the second main surface to reflect visible light while transmitting the infrared light, and the light receiving element is an infrared sensor configured to receive infrared light through the liquid crystal panel, second light guide, and infrared transmissive film.

15. The electronic equipment of claim 14, wherein the infrared transmissive film extends between the first side surface and the second side surface, and the second light source is positioned between the continuous surface and the infrared transmissive film.

* * * * *